United States Patent
Gupta (10) Patent No.: US 8,301,605 B2
(45) Date of Patent: Oct. 30, 2012

(54) MANAGING MAINTENANCE TASKS FOR COMPUTER PROGRAMS (75) Inventor: Pramod Gupta, Ontario (CA)

(73) Assignee: International Business Machines Corporation, Armonk, NY (US)

(*) Notice: Subject to any disclaimer, the term of this patent is extended or adjusted under 35 U.S.C. 154(b) by 465 days.

(21) Appl. No.: 11/958,160

(22) Filed: Dec. 17, 2007

(65) Prior Publication Data

US 2009/0157682 A1 Jun. 18, 2009

(51) Int. Cl.
G06F 7/10 (2006.01)
G06F 17/00 (2006.01)
G06F 17/30 (2006.01)

(52) U.S. Cl. .................................. 707/694; 707/736
(58) Field of Classification Search .................. None
See application file for complete search history.

(56) References Cited

U.S. PATENT DOCUMENTS

| | | | | | |
|---|---|---|---|---|---|
| 5,655,074 | A | * | 8/1997 | Rauscher | 714/38.1 |
| 6,477,562 | B2 | * | 11/2002 | Nemirovsky et al. | 718/108 |
| 6,519,763 | B1 | * | 2/2003 | Kaufer et al. | 717/101 |
| 6,633,878 | B1 | * | 10/2003 | Underwood | 1/1 |
| 7,117,184 | B1 | * | 10/2006 | Fontana et al. | 706/1 |
| 7,343,529 | B1 | * | 3/2008 | Klinkner et al. | 714/57 |
| 7,418,704 | B2 | * | 8/2008 | Hayashi | 718/100 |
| 2002/0044528 | A1 | * | 4/2002 | Pogrebinsky et al. | 370/230 |
| 2003/0056200 | A1 | * | 3/2003 | Li et al. | 717/128 |
| 2003/0060951 | A1 | * | 3/2003 | Mayer et al. | 701/29 |
| 2004/0015879 | A1 | * | 1/2004 | Pauw et al. | 717/127 |
| 2004/0054998 | A1 | * | 3/2004 | Hayashi | 718/102 |
| 2004/0078690 | A1 | * | 4/2004 | Kohashi | 714/38 |
| 2005/0183068 | A1 | * | 8/2005 | Cwalina et al. | 717/128 |
| 2005/0235220 | A1 | * | 10/2005 | Duperrouzel et al. | 715/788 |
| 2005/0283650 | A1 | * | 12/2005 | Zhang et al. | 714/6 |
| 2007/0156693 | A1 | * | 7/2007 | Soin et al. | 707/9 |
| 2007/0192641 | A1 | * | 8/2007 | Nagendra et al. | 713/320 |
| 2008/0065991 | A1 | * | 3/2008 | Grimes et al. | 715/719 |
| 2008/0104517 | A1 | * | 5/2008 | Horvitz | 715/733 |
| 2008/0141224 | A1 | * | 6/2008 | Kawasaki et al. | 717/127 |
| 2008/0215713 | A1 | * | 9/2008 | Cannon et al. | 709/221 |
| 2008/0262825 | A1 | * | 10/2008 | Haid et al. | 703/23 |
| 2008/0306797 | A1 | * | 12/2008 | Fayaz et al. | 705/8 |
| 2008/0313567 | A1 | * | 12/2008 | Sabin et al. | 715/835 |
| 2009/0005927 | A1 | * | 1/2009 | Schlatre et al. | 701/30 |
| 2009/0125619 | A1 | * | 5/2009 | Antani | 709/223 |
| 2009/0144154 | A1 | * | 6/2009 | Schein | 705/14 |
| 2011/0162073 | A1 | * | 6/2011 | Jeschke et al. | 726/25 |

* cited by examiner

Primary Examiner — Pierre Vital
Assistant Examiner — Taelor Kim
(74) Attorney, Agent, or Firm — Patterson & Sheridan, LLP (57) ABSTRACT A computer-implemented method for managing maintenance of a computer program can include the steps of receiving usage data from a plurality of users of the computer program, wherein the usage data identifies at least one portion of the computer program accessed by one of the users, and for each portion of the computer program, determining a usage according to the received usage data and assigning a priority level according to the determined usage, where the priority level indicates a relative priority of the portion compared to other portions in the computer program.

19 Claims, 3 Drawing Sheets

MANAGING MAINTENANCE TASKS FOR COMPUTER PROGRAMS

FIELD OF THE INVENTION

The present invention relates to the field of maintenance of computer programs, and more particularly to systems and methods for managing maintenance tasks for computer programs.

BACKGROUND

Software companies typically expend a large amount of resources for maintenance of their computer programs. For example, software companies typically perform a large amount of testing to search for defects in their computer programs. As a result of these efforts, many defects in these software products can be found and repaired prior to distribution of the computer program. However, maintenance of a computer program can be complex due to the interactivity of different portions within a computer program. In general, at least some care is needed when any changes are made to a computer program, as changes in one portion can affect adversely other portions of the computer program. Therefore, maintenance tasks for a computer program typically require a significant amount of resources not only to discover portions of the computer program requiring some modification, but also to perform additional testing to ensure that other portions of the computer program are unaffected by any changes in the modified portion of the computer program.

Unfortunately, there is generally no way for a software company to determine whether the particular portion of a computer program selected for maintenance is a portion that the customer would have selected for maintenance. As a result, software companies typically expend considerable resources performing maintenance for portions of a computer program which are either not used or infrequently used by many customers. Therefore, there exists a need for managing maintenance of computer programs based on user input.

SUMMARY

In a first embodiment of the present invention, a computer-implemented method for managing maintenance of a computer program is provided. The method can include receiving usage data from a plurality of users of the computer program, where the usage data identifies at least one portion of the computer program accessed by one of the users. The method can also include determining a usage according to the received usage data and assigning a priority level according to the determined usage for each portion of the computer program, where the priority level indicates a relative priority of the portion compared to other portions in the computer program.

In a second embodiment of the present invention, a system for managing maintenance of a computer program is provided. The system can include a storage element for storing usage data received from a plurality of users of the computer program, where the usage data identifies at least one portion of the computer program accessed by one of the users. The system can also include a processing element for determining a usage for each portion of the computer program according to the usage data stored in the storage element and assigning a priority level according to the determined usage, where the priority level indicates a relative priority of the portion compared to other portions in the computer program.

In a third embodiment of the present invention, a computer-readable storage is provided, the computer-readable storage having stored thereon a computer program for managing maintenance of computer programs. The computer program can include a plurality of code sections executable by a computer to cause the computer to perform the step of receiving usage data from a plurality of users of a computer program, where the usage data identifies at least one portion of the computer program accessed by one of the users. The computer program can also include code sections for determining a usage for each portion of the computer program according to the received usage data and assigning a priority level according to the determined usage, where the priority level indicates a relative priority of the portion compared to other portions in the computer program.

DETAILED DESCRIPTION OF THE DRAWINGS

Embodiments of the present invention provide systems and method for managing maintenance for various portions of a computer program. The term "computer program", as used herein, can refer to either an executable program (by both lay people and computer programmers) or the collection of source code from which an executable program is created (e.g., compiled), whether in whole or in part. Computer programs can consist of a sequence of instructions that can be executed directly by hardware. Computer programs can also be executed by software. Such computer programs can consist of a sequence of instructions in a coded or declarative form. Computer programs can also be executed in a distributed or centralized fashion.

One aspect of the present invention provides for ranking or assigning a priority level for maintenance to each portion of the computer program. Therefore, when multiple portions of a computer program require maintenance, the user input can be used to determine, at least in part, the order in which the one or more portions of the computer program should be maintained. By way of example and not by way of limitation, in the various embodiments of the present invention, priority can be assigned based on actual use, defectivity, user priority, a portion priority, a defect priority, or any combination thereof.

"Maintenance" as used herein refers to any action by a software engineer requiring analysis or alteration of a portion of a computer program. For example, a software engineer can test and analyze the output of a computer program to test and/or validate operation of the various portions of the computer program. In other cases, the software engineer can engage in alteration of one or more portions of the computer program. These alterations can be performed in response to defects in the computer program, but can also include any other types of changes required for the computer program, including any changes to extend or update the features of the computer program.

Figure 1:
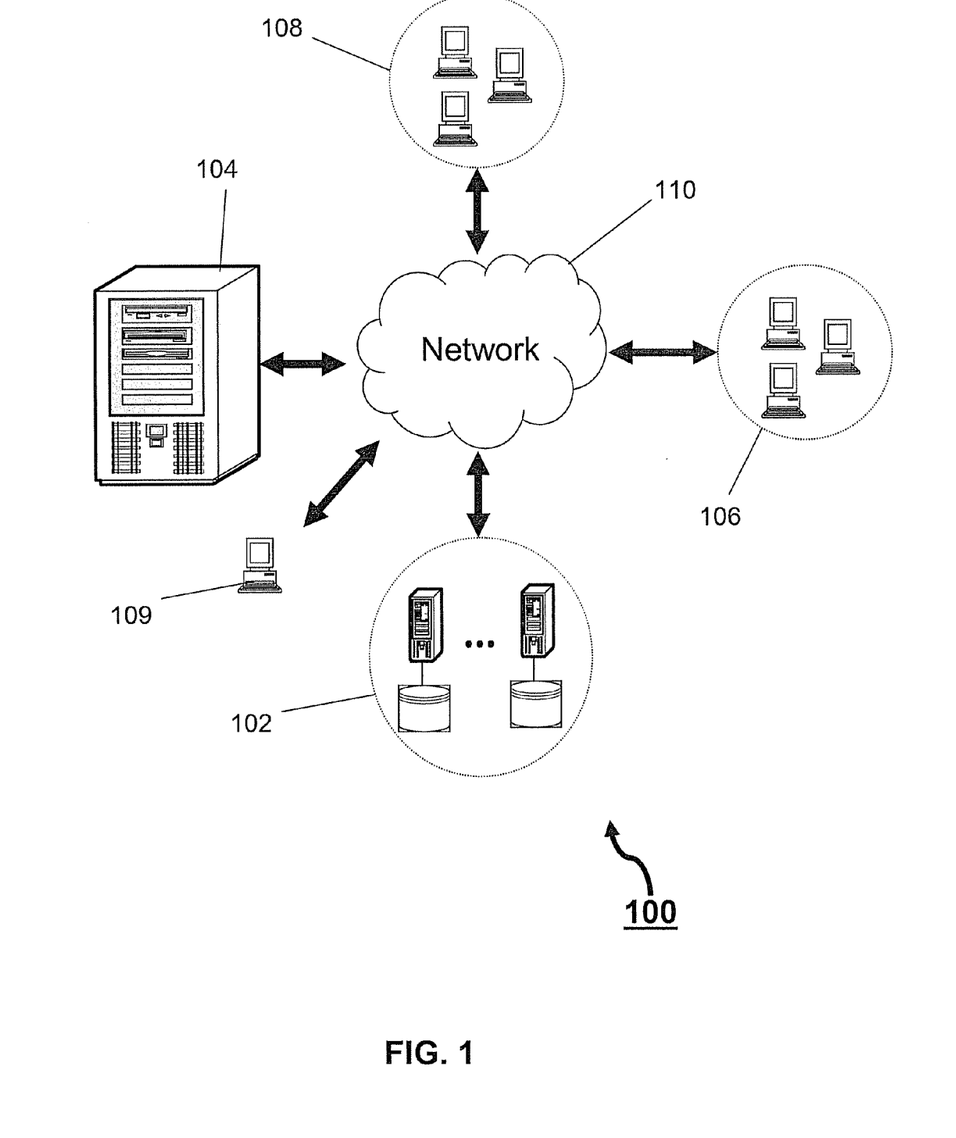
FIG. 1 is a schematic view of a system from managing maintenance of a computer program according to an embodiment of the present invention.

FIG. 1 depicts an exemplary embodiment of a system 100 for managing maintenance of computer program. The system 100 can include one or more user input databases (UIDs) 102 accessible by a maintenance management system (MMS) 104 that manages maintenance of computer program maintenance tasks according to the user data stored in the UIDs 102. In the exemplary system 100, user data for the MMS 104 can be provided to the UIDs 102 from one or more end-user interfaces or terminals 106 associated with one or more end-users. Based on the user data in the UIDs 102, the MMS 104 can then provide priority level information which can then be reported to one or more engineer terminals 108 associated with one or more software engineers performing maintenance tasks for the computer program.

In some embodiments, the engineer terminals 108 can also be used to provide additional user data for the UIDs 102 generated by software engineers. Furthermore, in some embodiments at least one of the engineer terminals 108 can also be used as an administrative interface. In such embodiments, the administrative interface can be used to submit priority rules for use by the MMS 104 or to configure operation of the MMS 104 and/or the UIDs 102. However, a separate administrative interface 109 can also be provided in some embodiments.

Although shown as a single computing system, the MMS 104 can be represented as centralized or decentralized computing devices. In the system 100, terminals 106, 108, 109 are shown connected by way of wire line or wireless access paths through a network 110 to the MMS 104. In embodiments where the MMS 104 comprises a distributed system, one or more of the terminals 106, 108 can be connected to the same or different components of the MMS 104 over the network. UIDs 102 can also operate as single computing systems or as centralized or decentralized computing devices. For example, in the exemplary system 100, UIDs 102 can comprise one or more local or remote computing systems deployed over a network 110. Furthermore, although the MMS 104 and the UIDs 102 are shown as separate systems, it is also within the scope of the invention for the MMS 104 and the UIDs 102 to operate as a single computing system.

Additionally, it is within the scope of the invention for terminals 106, 108, and 109 to represent any multimode communication device including, but not limited to, a cell phone, a personal computer or laptop, or personal digital assistant capable of supporting wire line and/or wireless communication technologies. In the case of wire line communications, terminals 106, 108, and 109 can utilize xDSL, cable, or PSTN telephony interfaces for communicating over the network 110, which can include hybrid technologies that support circuit-switched packet-switched communications. The terminals 106, 108, and 109 can also support accessory interfaces such as Universal Serial Bus (USB), Firewire, and other connectivity technologies.

Alternatively, or in combination, the terminals 106, 108, and 109 can support any number of wireless communication protocols such as the family of 802.xx protocols defined by the Institute of Electrical and Electronics Engineers (IEEE). For instance, terminals 106, 108, and 109 can utilize long-range wireless access technologies such as, for example, cellular, software defined radio (SDR) and/or WiMAX to communicate with the network 110. Cellular access technologies can include, for example, CDMA-1X, UMTS/HSDPA, GSM/GPRS, TDMA/EDGE, EV/DO, and next generation technologies as they emerge. Additionally, terminals 106, 108, and 109 can support short-range wireless technologies such as WiFi, Bluetooth, Zigbee, or cordless communications such as digital enhanced cordless telecommunications (DECT).

Figure 2:
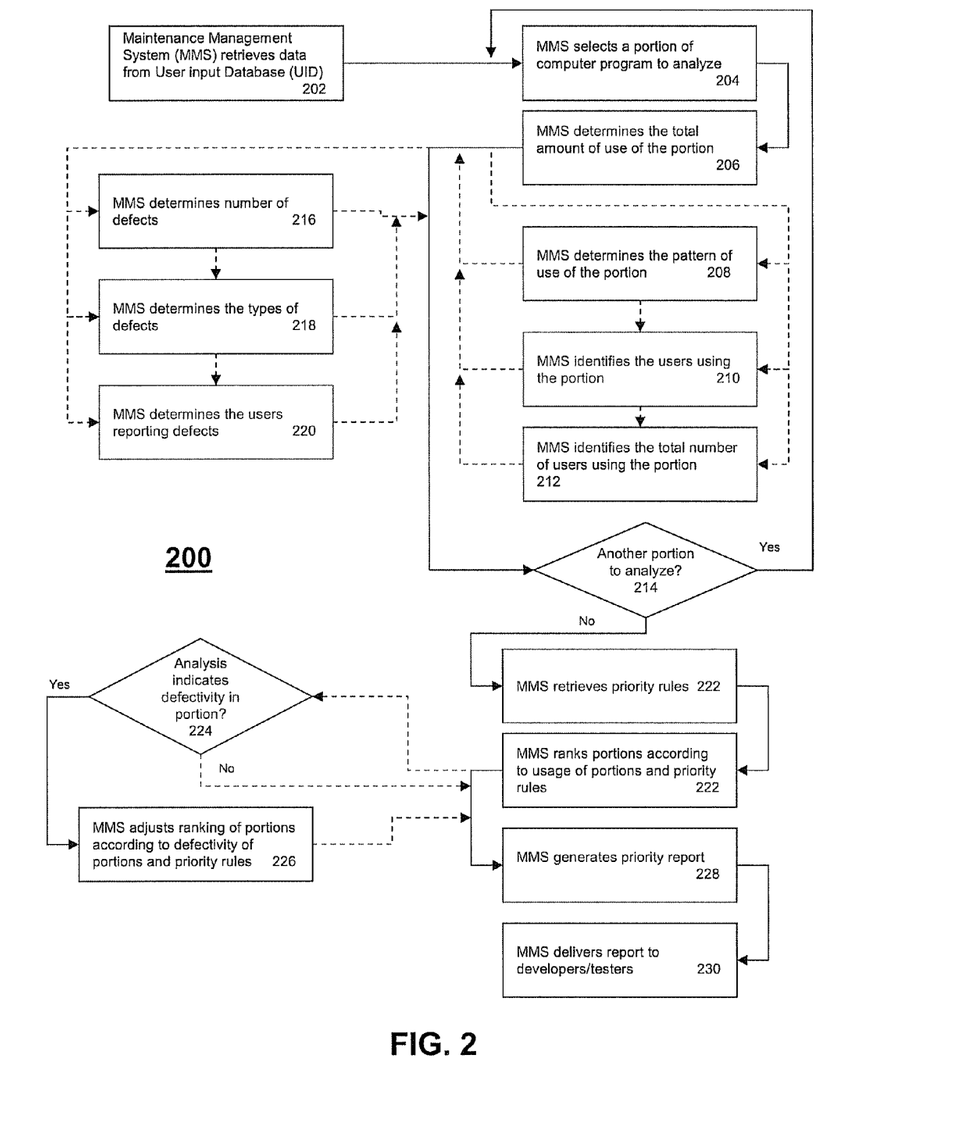
FIG. 2 is a flowchart of exemplary steps of a method for managing maintenance of a computer program according to an embodiment of the present invention.

FIG. 2 is a flowchart illustrating steps in an exemplary method 200 for managing maintenance of computer programs according to an embodiment of the present invention. In step 202, the MMS can first retrieve the accumulated data in the UIDs. In some embodiments, the data in the UIDs can be continuously updated by end-users or software engineers. For example, a computer program operating on an end-user terminal can be configured to continually monitor the usage of the various portions of the computer program and to report to the UIDs which portions of the computer program are being used by the user associated with end-user terminal. However, in other embodiments, the UIDs can instead be updated at specific intervals. For example, the computer program operating in the end-user terminal can be configured to collect usage data locally for a period of time and report the usage data only after the period of time has elapsed. In another example, the computer program can be configured to collect usage data until prompted by the UIDs to report the data. In embodiments where defectivity data is also being collected, similar methods can also be used to submit defectivity data to the UIDs. Although the usage data and defectivity data can be submitted separately to the UIDs, in some embodiments, a single block of user data can include both usage and defectivity data.

In the various embodiments, the data accumulated in the UIDs can include any type of information, as previously discussed. For example, the data from the user can include usage information for portions of the computer program. Such usage information can indicate whether a particular user used a particular portion of a computer program, when the portion was used, and/or how frequently the portion was used. In another example, the data from the user can specify defectivity data, as previously discussed. Such defectivity information can indicate defective portions of the computer program encountered by the user, the number of defects encountered within the portion, and/or the types of defects encountered within the portion.

Regardless of the type of information stored in the UIDs, the method 200 can then correlate or sort the data stored in the UIDs by portion of the computer program. First, the method 200 selects a portion of the computer program to analyze in step 204. In the various embodiments, the portion selected for analysis can be selected in various ways. For example, the MMS can select the portion by selecting each portion of the computer program, one by one, until data for all sections is correlated. In another example, the MMS can select the portions to analyze based on the user data. That is, the MSS selects only portions of the computer program that are referred to within the user data. Such configurations can increase the efficiency of the MMS, since portions of the computer program not specified in the user data need not be analyzed.

As previously discussed, the user data can include usage data. Accordingly, the MMS can be configured to determine the total use of the portion of the computer program in step 206. Alternatively or in combination with step 206, the MMS can also determine the pattern of use of the portion in step 208. That is, the MMS can determine not only total use of the portion, but also how frequently the portion is used or how the portion has been historically used by one or more of the users. Such a configuration allows the MMS to assign lower priority to portions of the computer program which have not be used recently or are only minimally used by one or more users. Also, alternatively or in combination with steps 206 and 208, the MMS can determine in step 210 the identity of the users using the portion in step 210. Such a configuration can be used in embodiments where priority is assigned, at least in part, on use of the portion by specific types of users. For example, in some embodiments, a higher priority can be assigned to portions of a computer program associated with use by one or more certain users. For instance, a higher priority can be assigned to portions used by end-users. In other instances, a particular end-user can have a higher priority than other end-users. Alternatively or in combination with steps 206, 208, and 210, the MMS can also determine the total number of users using the portion. Such a configuration can be helpful to identify portions used by many users, even if infrequently, and to assign a high priority to such sections based on its widespread use. Once the usage data is correlated, the MMS can then determine if at least one other portion of the computer program needs to be analyzed in step 214. If another portion needs to be analyzed in step 214, then the next portion can be selected and analyzed starting with step 204.

In embodiments where the user data includes defectivity data, the defectivity data in the UIDs can also be correlated by portions of the computer program. For example, in step 216, the MMS can determine the total number of defects reported for the portion. Alternatively, or in combination with step 216, the MMS can also determine the types of defects being reported for the portion in step 218. In some embodiments, the types of defects are reported in the user data by including the error message or other indicator of the type of defect occurring. In other embodiments, the portion of the computer program in which the defect occurred can be sufficient to determine the type of error, as the portion can be associated with a particular type of task for the computer program. Accordingly, depending on the type of error, a portion can be assigned a higher priority based on how critical the type of defect is or a pre-determined priority assigned to certain types of defects. Alternatively or in combination with steps 216 and 218, the MMS can also determine the identity of users reporting defects in step 220. Such configurations can be used to assign a high priority to a portion of the computer program associated with defects found by certain users. Once the defectivity is correlated using any of steps 216-220, the MMS can determine if at least one other portion of the computer program needs to be analyzed in step 214. If other portion needs to be analyzed in step 214, then the next portion can be selected and analyzed starting with step 204, as previously discussed.

Once the input data for all portions of the computer program has been correlated, the MMS can retrieve the priority rules to be used for managing maintenance of the portions of the computer program in step 222. In the various embodiments, the priority rules can be stored in various locations. For example, in some embodiments, the administrative interface, as previously discussed, can be used to submit the priority rules directly to a storage element of the MMS. In another example, the priority rules can be stored along with the user data in the UIDs. In still another example, a storage element of the administrative interface can be used to store the rules. In yet other examples, a remote storage element can be used to store the rules.

After the rules are retrieved from their storage location in step 222, the MMS can rank the portions or assign a priority level to the portions in step 224 according to the priority rules for the MMS and the usage data. That is, each of the portions can be compared or analyzed according to the priority rules to determine the level of priority for the portion based on usage of the portion. For example, in some embodiments, the priority rules can specify that a frequently used portion or recently used portion can have a higher priority level than other portions. In another example, the priority rules can specify, as previously discussed, that portions used by particular users can have a higher priority than portions used by only other users. In yet another example, the priority rules can specify that portions used by at least some minimum number of users can have a greater priority than other portions. However, the present invention is not limited to assigning a priority level based on a single rule. Accordingly, in some embodiments, multiple rules can be combined.

As previously described, the user data, and consequently the correlated data for each portion, can also contain defectivity data. Therefore, even after usage data is used to assign a priority level to the portions in step 224, the method provides for determining in step 226 whether any defectivity data exists for the portion. If defectivity data is found in step 226, the ranking or priority level for the portion can be adjusted according to the defectivity data and associated priority rules in step 228. That is, as in step 224, each of the portions can be compared or analyzed according to the priority rules to determine the level of priority for the portion based on defectivity of the portion. For example, in some embodiments, the priority rules can specify that one or more portions having at least a specific number of defects can have a higher priority than other portions. In another example, the priority rules can also specify, as previously discussed, that portions with particular type of defects will have a higher priority than other portions. In yet another example, the priority rules can specify that portions with defects reported by one or more certain user can have a higher priority than portions with defects reported by only other users. In still another example, the priority rules can specify that any portion with defects can have a higher priority than a portion without defects. Furthermore, specific portions with defects can also be assigned a higher priority than any other portions without defects.

Although method 200 shows the assignment of a priority level as a two step process (assign based on usage, then adjust based on defectivity), the invention is not limited in this regard. In some embodiments, evaluation of defectivity- and usage-based priority rules can occur concurrently. In some embodiments, a priority rule can specify any combination of rules, include one or more defectivity-based rules and one or more usage-based rules.

Regardless of the priority rules being applied, the method for assigning a priority level can vary. For example, the priority level can be based on a score associated with the extent to which a portion meets or exceed one of the conditions specified in the priority rule. In the case of multiple rules, a sum of the scores for each rule can be used. However, in some embodiments, the scores can also be weighted accordingly to importance of one priority rule over another to the software company. However, in some embodiments, scores are not necessary, and the portions can be sorted into groups according the number of conditions specified in the priority rule the portions meet. In such embodiments, the number and priority level for these groups can be pre-defined.

Once the portions are assigned a priority level, the MMS can generate a priority report in step 230. In the various embodiments, the report can be provided in various ways. For example, in some embodiments the report can include an identification of the various portions of the computer program and a priority assigned to each portion. In other embodiments, the report can provide a ranked list of the portions according to the assigned priority. In the cases where specific portions of the computer program code can be identified, a listing of the computer program code can be generated, where the portions having highest and/or lowest priority can be identified using some type of indicia or alteration of the representation of the code listing. For example, color coding of a code listing can be used. In another example, the type, size, format, or style of font in the code listing can be altered. Once the report is generated in step 230, the MMS can deliver the report to the software engineers in step 232 to provide them with information regarding where subsequent maintenance efforts should be directed.

Upon reviewing the aforementioned embodiments, it would be evident to one of ordinary skill in the art that the embodiments can be modified, reduced, or enhanced without departing from the scope and spirit of the claims described below. For example, in method 200, the priority levels are assigned based on usage data and adjusted according to defectivity data. However, in some embodiments, the priority levels can instead be initially assigned based on defect levels and subsequently adjusted for usage. That is, a priority level would only be assigned to a portion of the computer program actually containing defects. In such configurations, the priority report then only identifies the portions of the computer program actually requiring a repair. In another embodiment, the MMS can be configured to analyze user data only if the user data is associated with a portion specified by particular types of users. Therefore, rather than generating a priority report that specifies a priority level for any portion of the computer program, the priority report is limited to portions of the computer program associated with critical users. For example, the MMS can be configured to analyze data associated only with portions of the computer program specified by end-users. Accordingly, if a software engineer specifies another portion in their user data, the data is ignored by the MMS. However, if the user data from the software engineer includes data associated with one of the portions specified by the end-user, this data can be used by the MMS. In still other embodiments, the MMS can correlate the data as it is received, but can be configured only to provide a priority report in response to a triggering event. For example, a triggering event can be a request for a priority report from a software engineer, an elapsed period of time, the presence of a specific type of defect in the correlated data, a defect being reported by one or more specific users, a specific type of defect being reported by one or more users, or usage in of a previously unused or infrequently used portion of the computer program by one or more specific users.

Figure 3:
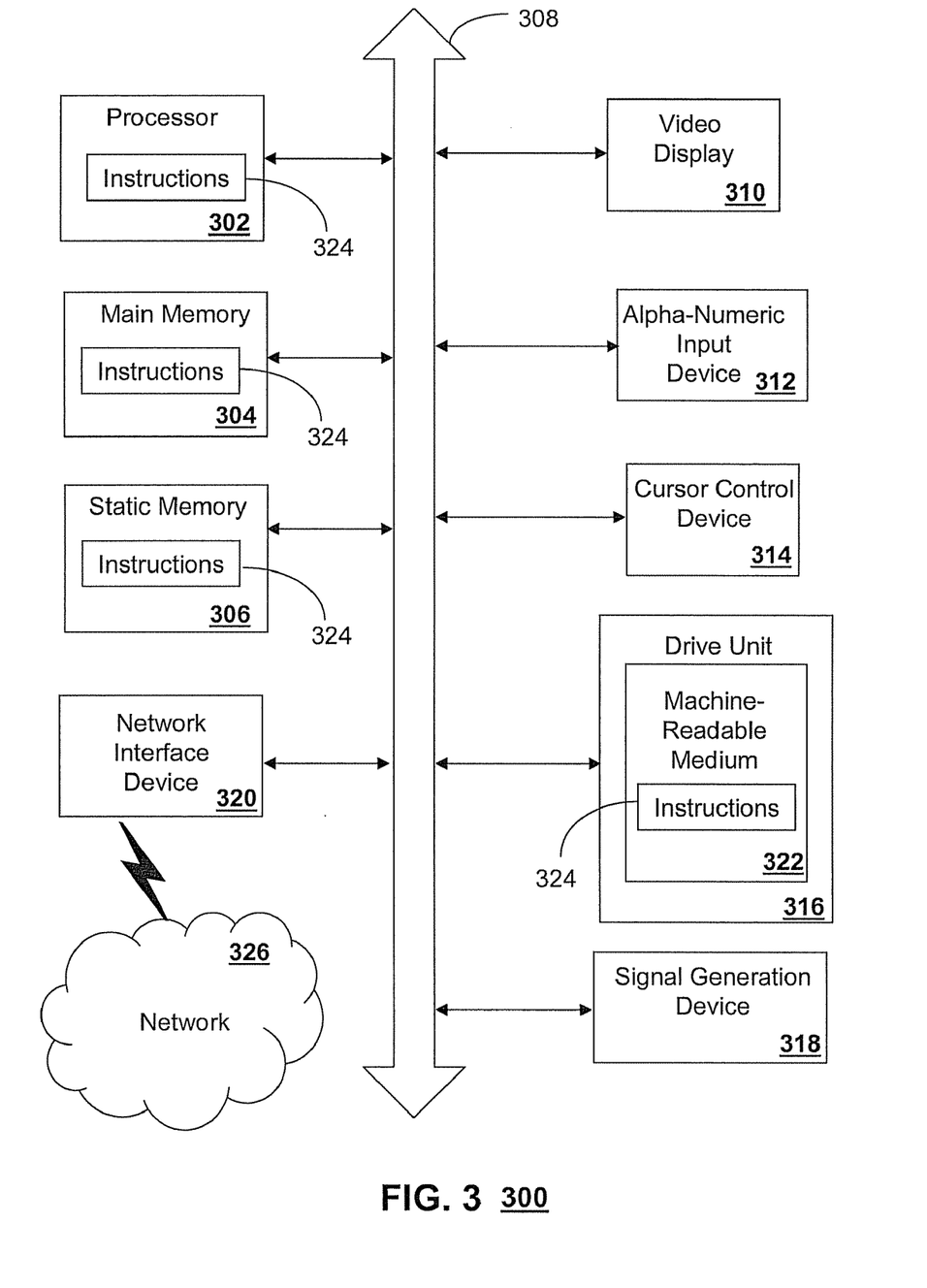
FIG. 3 is a schematic view of a computer system within which a set of instructions operate according to an embodiment of the present invention.

FIG. 3 is a schematic diagram of a computer system 300 for executing a set of instructions that, when executed, can cause the computer system to perform one or more of the methodologies and procedures described above. In some embodiments, the computer system 300 operates as a standalone device. In other embodiments, the computer system 300 can be connected (e.g., using a network) to other computing devices. In a networked deployment, the computer system 300 can operate in the capacity of a server or a client developer machine in server-client developer network environment, or as a peer machine in a peer-to-peer (or distributed) network environment.

The machine can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 300 can include a processor 302 (such as a central processing unit (CPU), a graphics processing unit (GPU, or both), a main memory 304 and a static memory 306, which communicate with each other via a bus 308. The computer system 300 can further include a display unit 310, such as a video display (e.g., a liquid crystal display or LCD), a flat panel, a solid state display, or a cathode ray tube (CRT)). The computer system 300 can include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 can include a computer-readable storage medium 322 on which is stored one or more sets of instructions 324 (e.g., software code) configured to implement one or more of the methodologies, procedures, or functions described herein. The instructions 324 can also reside, completely or at least partially, within the main memory 304, the static memory 306, and/or within the processor 302 during execution thereof by the computer system 300. The main memory 304 and the processor 302 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 324 or that receives and executes instructions 324 from a propagated signal so that a device connected to a network environment 326 can send or receive voice and/or video data, and that can communicate over the network 326 using the instructions 324. The instructions 324 can further be transmitted or received over a network 326 via the network interface device 320.

While the computer-readable storage medium 322 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A computer-implemented method, comprising:
performing an operation to facilitate prioritizing program maintenance of a computer program by communicating with a plurality of instances of the computer program, each instance executing on a respective client, wherein the computer program is logically divided into a plurality of modules, and wherein the computer program is configured to log, at a predetermined interval of time, execution and error information at least at module-specific and user-specific granularity, wherein the operation comprises:
detecting an occurrence of a trigger event configured to occur upon each of at least two of: a first event comprising receiving a request to prioritize program maintenance of the plurality of modules; a second event comprising receiving an indication of a program error in the computer program; a third event comprising determining that the reported program error pertains to a module of the plurality of modules, that has an execution frequency below a threshold; and a fourth event comprising determining that a predefined period of time has elapsed since a previous occurrence of the trigger event;
upon detecting the occurrence of the trigger event, analyzing at least a subset of the logged execution and error information to determine, for each module of the computer program, an execution frequency and an error frequency; and
determining, by operation of one or more computer processors, a plurality of maintenance priority scores including, for each module of the computer program, a maintenance priority score based on the execution frequency and the error frequency for the respective module of the computer program and further based on one or more priority scoring rules, wherein program maintenance comprises altering code associated with the computer program to correct one or more program errors in the computer program and is performed on the plurality of modules in an order determined based on the plurality of maintenance priority scores.

2. The computer-implemented method of claim 1, wherein the execution and error information indicates a history of use of each module by one or more users of the computer program.

3. The computer-implemented method of claim 2, wherein the program maintenance is prioritized based on a comparison of respective total amounts of use of the modules of the computer program within a predetermined period of time.

4. The computer-implemented method of claim 2, wherein the program maintenance is prioritized based on a comparison of respective total numbers of the one or more users accessing the modules of the computer program within a predetermined period of time.

5. A system, comprising:
one or more computer processors;
a memory containing an application which, when executed by the one or more computer processors, is configured to perform an operation to facilitate prioritizing program maintenance of a computer program by communicating with a plurality of instances of the computer program, each instance executing on a respective client, wherein the computer program is logically divided into a plurality of modules, and wherein the computer program is configured to log, at a predetermined interval of time, execution and error information at least at module-specific and user-specific granularity, wherein the operation comprises:
detecting an occurrence of a trigger event configured to occur upon each of at least two of: a first event comprising receiving a request to prioritize program maintenance of the plurality of modules; a second event comprising receiving an indication of a program error in the computer program; a third event comprising determining that the reported program error pertains to a module of the plurality of modules, that has an execution frequency below a threshold; and a fourth event comprising determining that a predefined period of time has elapsed since a previous occurrence of the trigger event;

upon detecting the occurrence of the trigger event, analyzing at least a subset of the logged execution and error information to determine, for each module of the computer program, an execution frequency and an error frequency; and determining a plurality of maintenance priority scores including, for each module of the computer program, a maintenance priority score based on the execution frequency and the error frequency for the respective module of the computer program and further based on one or more priority scoring rules, wherein program maintenance comprises altering code associated with the computer program to correct one or more program errors in the computer program and is performed on the plurality of modules in an order determined based on the plurality of maintenance priority scores.

6. The system of claim 5, wherein the execution and error information indicates a history of use of each module by one or more users of the computer program.

7. The system of claim 6, wherein the program maintenance is prioritized based on a comparison of respective total amounts of use of the modules of the computer program within a predetermined period of time.

8. The system of claim 6, wherein the program maintenance is prioritized based on a comparison of respective total numbers of the users accessing the modules of the computer program within a predetermined period of time.

9. A computer program product, comprising:

a computer-readable storage device having computer-readable program code embodied therewith to facilitate prioritizing program maintenance of a computer program by communicating with a plurality of instances of the computer program, each instance executing on a respective client, wherein the computer program is logically divided into a plurality of modules, and wherein the computer program is configured to log, at a predetermined interval of time, execution and error information at least at module-specific and user-specific granularity, the computer-readable program code comprising:

computer-readable program code configured to detect an occurrence of a trigger event configured to occur upon each of at least two of: a first event comprising receiving a request to prioritize program maintenance of the plurality of modules; a second event comprising receiving an indication of a program error in the computer program; a third event comprising determining that the reported program error pertains to a module of the plurality of modules, that has an execution frequency below a threshold; and a fourth event comprising determining that a predefined period of time has elapsed since a previous occurrence of the trigger event;

computer-readable program code configured to, upon detecting the occurrence of the trigger event, analyze at least a subset of the logged execution and error information to determine, for each module of the computer program, an execution frequency and an error frequency; and computer-readable program code configured to determine, by operation of one or more computer processors when executing the computer-readable program code, a plurality of maintenance priority scores including, for each module of the computer program, a maintenance priority score based on the execution frequency and the error frequency for the respective module of the computer program and further based on one or more priority scoring rules, wherein program maintenance comprises altering code associated with the computer program to correct one or more program errors in the computer program and is performed on the plurality of modules in an order determined based on the plurality of maintenance priority scores.

10. The computer program product of claim 9, wherein the execution and error information indicates a history of use of each module by one or more users of the computer program.

11. The computer program product of claim 10, wherein the program maintenance is prioritized based on a comparison of at least one of: (i) respective total amounts of use of the modules of the computer program within a predetermined period of time and (ii) respective total numbers of users accessing the modules of the computer program within the predetermined period of time.

12. The computer-implemented method of claim 1, wherein the code associated with the computer program comprises at least one of source code and executable code.

13. The system of claim 5, wherein the code associated with the computer program comprises at least one of source code and executable code.

14. The computer program product of claim 9, wherein the code associated with the computer program comprises at least one of source code and executable code.

15. The computer-implemented method of claim 1, wherein the plurality of maintenance priority scores is determined by an application, wherein the one or more priority scoring rules specify at least one of a plurality of positive correlations between priority score and a plurality of attributes, wherein the application comprises a maintenance management application configured to communicate with each instance of the computer program via a maintenance data store, wherein the logged execution and error information is stored in the maintenance data store, wherein the plurality of attributes include execution frequency, error frequency, user identity, user count, and program error type, wherein the computer program is logically divided into the plurality of modules based on user input, wherein each module is uniquely identifiable via a respective module name.

16. The computer-implemented method of claim 15, wherein the one or more priority scoring rules are user-defined and specify a first positive correlation between execution frequency and priority score, a second positive correlation between error frequency and priority score, a third positive correlation between user identity and priority score, a fourth positive correlation between user count and priority score, and a fifth positive correlation between program error type and priority score.

17. The system of claim 5, wherein the one or more priority scoring rules specify at least one of a plurality of positive correlations between priority score and a plurality of attributes, wherein the application comprises a maintenance management application configured to communicate with each instance of the computer program via a maintenance data store, wherein the logged execution and error information is stored in the maintenance data store, wherein the plurality of attributes include execution frequency, error frequency, user identity, user count, and program error type, wherein the computer program is logically divided into the plurality of modules based on user input, wherein each module is uniquely identifiable via a respective module name.

18. The system of claim 17, wherein the one or more priority scoring rules are user-defined and specify a first positive correlation between execution frequency and priority score, a second positive correlation between error frequency and priority score, a third positive correlation between user identity and priority score, a fourth positive correlation between user count and priority score, and a fifth positive correlation between program error type and priority score.

19. The computer program product of claim 9, wherein the one or more priority scoring rules specify at least one of a plurality of positive correlations between priority score and a plurality of attributes, wherein the computer-readable program code is at least part of an application comprising a maintenance management application configured to communicate with each instance of the computer program via a maintenance data store, wherein the logged execution and error information is stored in the maintenance data store, wherein the plurality of attributes include execution frequency, error frequency, user identity, user count, and program error type, wherein the computer program is logically divided into the plurality of modules based on user input, wherein each module is uniquely identifiable via a respective module name.

* * * * *